United States Patent
Mu

(10) Patent No.: US 12,489,548 B2
(45) Date of Patent: Dec. 2, 2025

(54) METHOD AND APPARATUS FOR INDICATING LINK ADAPTATION PARAMETERS, AND METHOD AND APPARATUS FOR DETERMINING LINK ADAPTATION PARAMETERS

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 439 days.

(21) Appl. No.: 17/997,211

(22) PCT Filed: Apr. 27, 2020

(86) PCT No.: PCT/CN2020/087330
§ 371 (c)(1),
(2) Date: Oct. 26, 2022

(87) PCT Pub. No.: WO2021/217374
PCT Pub. Date: Nov. 4, 2021

(65) Prior Publication Data
US 2023/0198661 A1 Jun. 22, 2023

(51) Int. Cl.
*H04L 1/00* (2006.01)
*H04L 1/08* (2006.01)

(52) U.S. Cl.
CPC .......... *H04L 1/0033* (2013.01); *H04L 1/0003* (2013.01); *H04L 1/0009* (2013.01); *H04L 1/08* (2013.01)

(58) Field of Classification Search
CPC ... H04L 1/0033; H04L 1/0003; H04L 1/0009; H04L 1/08
See application file for complete search history.

(56) References Cited

U.S. PATENT DOCUMENTS

2007/0253386 A1\* 11/2007 Li ................. H04L 1/0025
370/338
2010/0014500 A1 1/2010 Lee et al.
(Continued)

FOREIGN PATENT DOCUMENTS

| CN | 101682463 A | 3/2010 |
| CN | 104283638 A | 1/2015 |

(Continued)

OTHER PUBLICATIONS

"Downlink Control Signaling for Must", ITRI, 3GPP TSG RAN WG1 Meeting #82bis, RI-155554, 2015, 4 pages.

(Continued)

*Primary Examiner* — Michael Thier
*Assistant Examiner* — Tracy Lauren Raimondo
(74) *Attorney, Agent, or Firm* — Oblon, McClelland, Maier & Neustadt, L.L.P.

(57) ABSTRACT

The present disclosure provides a method and apparatus for indicating link adaptation parameters, and a method and apparatus for determining link adaptation parameters. The method for indicating link adaptation parameters can include determining a link adaptation parameter subset from a link adaptation parameter set, wherein the link adaptation parameter subset includes one or more link adaptation parameters, and transmitting indication information for indicating a target link adaptation parameter to a terminal, wherein the target link adaptation parameter is a link adaptation parameter in the link adaptation parameter subset.

20 Claims, 8 Drawing Sheets

(56) References Cited

U.S. PATENT DOCUMENTS

| | | | |
|---|---|---|---|
| 2013/0143494 A1 | 6/2013 | Chen et al. | |
| 2013/0215985 A1 | 8/2013 | Lee et al. | |
| 2014/0334425 A1 | 11/2014 | Lee et al. | |
| 2015/0249998 A1* | 9/2015 | Long | H04L 5/001 370/329 |
| 2017/0324508 A1* | 11/2017 | Vanninen | H04L 1/0003 |
| 2018/0191426 A1* | 7/2018 | Mirra | H04W 28/0958 |
| 2020/0213033 A1 | 7/2020 | Chen | |
| 2021/0168641 A1* | 6/2021 | Frenne | H04L 1/0026 |
| 2021/0306874 A1* | 9/2021 | Bedekar | H04L 1/001 |

FOREIGN PATENT DOCUMENTS

| | | |
|---|---|---|
| CN | 110546971 A | 12/2019 |
| WO | WO 2018/126763 A1 | 7/2018 |
| WO | WO 2018/210195 A1 | 11/2018 |
| WO | WO 2019/051679 A1 | 3/2019 |
| WO | WQ 2019/153196 A1 | 8/2019 |

OTHER PUBLICATIONS

"On PDCCH Enhancements for eURLLC", InterDigital Inc., 3GPP TSG RAN WG1 #97, RI-1907110, 2019, 3 pages.

International Search Report with English translation mailed on Jan. 28, 2021 in PCT/CN2020/087330 filed on Apr. 27, 2020.

Combined Chinese Office Action and Search Report issued on Apr. 15, 2023 in Chinese Patent Application No. 202080000802.6 (with unedited computer-generated English translation of Office Action only), 15 pages.

Written Opinion of the International Searching Authority mailed on Jan. 28, 2021 in PCT/CN2020/087330 filed on Apr. 27, 2020, 6 pages (with English translation).

State Intellectual Property Office of the People's Republic of China, Office Action and Search Report Issued in Application No. 2023112295525. Aug. 9, 2025, 6 pages. (submitted unedited computer-generated English translation; Documents 15-17 being cited therein).

\* cited by examiner

METHOD AND APPARATUS FOR INDICATING LINK ADAPTATION PARAMETERS, AND METHOD AND APPARATUS FOR DETERMINING LINK ADAPTATION PARAMETERS

CROSS REFERENCE TO RELATED APPLICATIONS

This application is the national phase of International Application No. PCT/CN2020/087330 filed on Apr. 27, 2020, the disclosure of which is hereby incorporated by reference in its entirety.

BACKGROUND OF THE INVENTION

Field of the Invention

The present disclosure relates to the field of communication technologies, and in particular to a method for indicating link adaptation parameters, a method for determining link adaptation parameters, an apparatus for indicating link adaptation parameters, an apparatus for determining link adaptation parameters, an electronic device and a computer readable storage medium.

Description of the Related Art

When communicating with a terminal, in order to enable the terminal to adapt to a state of a current link, a base station can transmit one or more link adaptation parameters such as one or more modulation and coding schemes (MCSs) and one or more transmission repetition numbers of downlink information.

Based on different states of a channel, the terminal needs an appropriate modulation and coding scheme for data transmission, and the modulation and coding scheme is indicated to the terminal by the base station based on a modulation and coding scheme table. The modulation and coding scheme table contains a plurality of modulation and coding schemes and an index corresponding to each of the plurality of modulation and coding schemes, that is, a modulation and coding scheme index. The base station can indicate the index of the modulation and coding scheme through a plurality of bits in downlink control information (DCI), and then indicate the modulation and coding scheme corresponding to the index.

For example, in New Radio (NR), the modulation and coding scheme table includes thirty-two modulation and coding schemes, therefore, the base station needs to indicate the modulation and coding scheme through five bits in the downlink control information, resulting in a relatively large amount of downlink control information being occupied.

In order to enhance coverage, the base station can repeatedly transmit the downlink information to the terminal. At the same time, considering that the state of the channel of the terminal will change, a plurality of candidate transmission repetition numbers will be configured for the terminal, and the base station needs to indicate one transmission repetition number in a transmission repetition number set to the terminal through the plurality of bits in the downlink control information, resulting in the relatively large amount of downlink control information being occupied.

SUMMARY OF THE INVENTION

In view of this, embodiments of the present disclosure provide a method for indicating link adaptation parameters, a method for determining link adaptation parameters, an apparatus for indicating link adaptation parameters, an apparatus for determining link adaptation parameters, an electronic device and a computer readable storage medium to solve technical problems in the related art.

According to a first aspect of the embodiments of the present disclosure, there is provided a method for indicating link adaptation parameters, including determining a link adaptation parameter subset from a link adaptation parameter set, wherein the link adaptation parameter subset includes one or more link adaptation parameters, and transmitting indication information for indicating a target link adaptation parameter to a terminal, wherein the target link adaptation parameter is a link adaptation parameter in the link adaptation parameter subset.

According to a second aspect of the embodiments of the present disclosure, there is provided a method for determining link adaptation parameters, including receiving indication information for indicating a link adaptation parameter transmitted by a base station, and determining, according to a prestored association relationship between indication information with link adaptation parameter subset out of link adaptation parameter set, a target link adaptation parameter in a link adaptation parameter subset which corresponds to the received indication information.

According to a third aspect of the embodiments of the present disclosure, there is provided an apparatus for indicating link adaptation parameters, including a subset determining module configured to determine a link adaptation parameter subset from a link adaptation parameter set, wherein the link adaptation parameter subset includes one or more link adaptation parameters, and an indication transmitting module configured to transmit indication information for indicating a target link adaptation parameter to a terminal, wherein the target link adaptation parameter is a link adaptation parameter in the link adaptation parameter subset.

According to a fourth aspect of the embodiments of the present disclosure, there is provided an apparatus for determining link adaptation parameters, including an indication receiving module configured to receive indication information for indicating a link adaptation parameter transmitted by a base station, and a subset determining module configured to determine, according to a prestored association relationship between indication information with link adaptation parameter subset out of link adaptation parameter set, a target link adaptation parameter in a link adaptation parameter subset which corresponds to the received indication information.

According to a fifth aspect of the embodiments of the present disclosure, there is provided an electronic device, including a processor and a memory for storing instructions executable by the processor. The processor is configured to implement the method for indicating link adaptation parameters described in any of the above embodiments.

According to a sixth aspect of the embodiments of the present disclosure, there is provided an electronic device, including a processor and a memory for storing instructions executable by the processor. The processor is configured to implement the method for determining link adaptation parameters described in any of the above embodiments.

According to a seventh aspect of the embodiments of the present disclosure, a non-transitory computer readable storage medium storing a computer program, wherein the computer program, when executed by a processor, causing the processor to implement the steps of the method for indicating link adaptation parameters described in any of the above embodiments.

According to an eighth aspect of an embodiment of the present disclosure, a non-transitory computer readable storage medium storing a computer program, wherein the computer program, when executed by a processor, causing the processor to implement the steps of the method for determining link adaptation parameters described in any of the above embodiments.

According to the embodiments of the present disclosure, the base station does not have to determine the target link adaptation parameter to be indicated in the link adaptation parameter set to the terminal, but can determine the link adaptation parameter subset from the link adaptation parameter set, and then select the target link adaptation parameter from the link adaptation parameter subset to indicate to the terminal.

Since the number of link adaptation parameters in the link adaptation parameter subset is less than that of link adaptation parameters in the link adaptation parameter set, compared with the indication information generated by determining the target link adaptation parameter in the link adaptation parameter set, the number of bits required for the indication information generated by determining the target link adaptation parameter in the link adaptation parameter subset is reduced, thereby saving communication resources.

BRIEF DESCRIPTION OF THE DRAWINGS

In order to explain the technical solutions more clearly in the embodiments of the present disclosure, the drawings required for the description of the embodiments will be briefly introduced below. It is obvious that the drawings in the following description are only some embodiments of the present disclosure. For those of ordinary skill in the art, other drawings can also be obtained based on these drawings, without paying any creative labor.

DETAILED DESCRIPTION OF THE PREFERRED EMBODIMENTS

The technical solutions in the embodiments of the present disclosure will be described clearly and completely in conjunction with the drawings in the embodiments of the present disclosure below. Obviously, the described embodiments are only a part of the embodiments of the present disclosure, but not all the embodiments. Based on the embodiments in the present disclosure, all other embodiments obtained by a person of ordinary skill in the art without creative efforts fall within the protection scope of the present disclosure.

Figure 1:
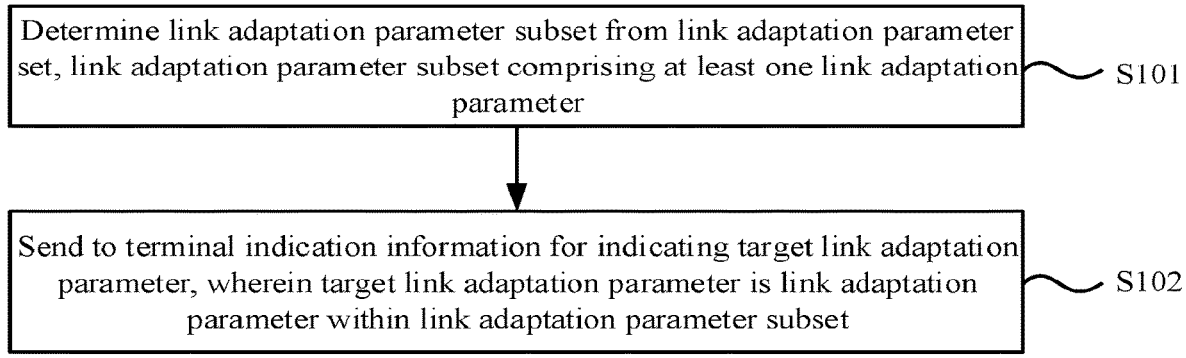
FIG. 1 is a schematic flowchart illustrating a method for indicating link adaptation parameters according to an embodiment of the present disclosure.

FIG. 1 is a schematic flowchart illustrating a method for indicating link adaptation parameters according to an embodiment of the present disclosure. The method for indicating link adaptation parameters shown in this embodiment can be applied to a base station such as a 5G NR base station and a 4G LTE base station. The base station can communicate with a terminal as user equipment. The terminal includes, but is not limited to, a mobile phone, a tablet computer, a wearable device, a personal computer, intelligent furniture, an industrial sensor, and the like. The type of the terminal can be an NR-lite terminal.

As shown in FIG. 1, the method for indicating link adaptation parameters can include following steps:

in step S101, a link adaptation parameter subset is determined from a link adaptation parameter set, wherein the link adaptation parameter subset includes one or more link adaptation parameters; and in step S102, indication information for indicating a target link adaptation parameter is transmitted to a terminal, wherein the target link adaptation parameter is a link adaptation parameter in the link adaptation parameter subset.

In one embodiment, the base station does not have to determine the target link adaptation parameter to be indicated in the link adaptation parameter set to the terminal, but can first determine the link adaptation parameter subset from the link adaptation parameter set, for example, according to channel state information of the terminal, one or more link adaptation parameters applicable to the channel state information in the link adaptation parameter set can be determined as the link adaptation parameter subset, which can be a proper link adaptation parameter subset, that is, the number of link adaptation parameters in the link adaptation parameter subset is less than that of link adaptation parameters in the link adaptation parameter set. When one or more link adaptation parameters are subsequently indicated to the terminal, the base station can select the target link adaptation parameter from the link adaptation parameter subset to indicate to the terminal.

In all embodiments of the present disclosure, the link adaptation parameter subset can be configured by the base station to the terminal, or determined according to a protocol, or respectively determined by the base station and the terminal based on the same determination method, or determined by the terminal through one or more parameters transmitted by the base station.

It should be noted that the operation of the base station to indicate the target link adaptation parameter to the terminal can be performed multiple times, that is, the above step S102 can be performed multiple times. And determining the link adaptation parameter subset from the link adaptation parameter set, that is, step S101, can be performed only once before the base station indicates the target link adaptation parameter to the terminal, so that the base station can determine one or more link adaptation parameters as the link adaptation parameter subset.

According to the embodiments of the present disclosure, the base station does not have to determine the target link adaptation parameter to be indicated in the link adaptation parameter set to the terminal, but can determine the link adaptation parameter subset from the link adaptation parameter set, and then select the target link adaptation parameter from the link adaptation parameter subset to indicate to the terminal.

Since the number of link adaptation parameters in the link adaptation parameter subset is less than that of link adaptation parameters in the link adaptation parameter set, compared with the indication information generated by determining the target link adaptation parameter in the link adaptation parameter set, the number of bits required for the indication information generated by determining the target link adaptation parameter in the link adaptation parameter subset is reduced, thereby saving communication resources.

For example, in NR, a modulation and coding scheme table includes thirty-two modulation and coding schemes, that is, the number of a modulation and coding scheme set is 32, so the base station needs five-bit indication information to indicate the modulation and coding schemes. According to the embodiment of the present disclosure, the link adaptation parameter subset is only a part of the modulation and coding schemes in the above thirty-two modulation and coding schemes. For example, the link adaptation parameter subset includes four modulation and coding schemes, and the base station only needs two-bit indication information to indicate the modulation and coding schemes, thereby reducing the number of occupied bits.

Figure 2:
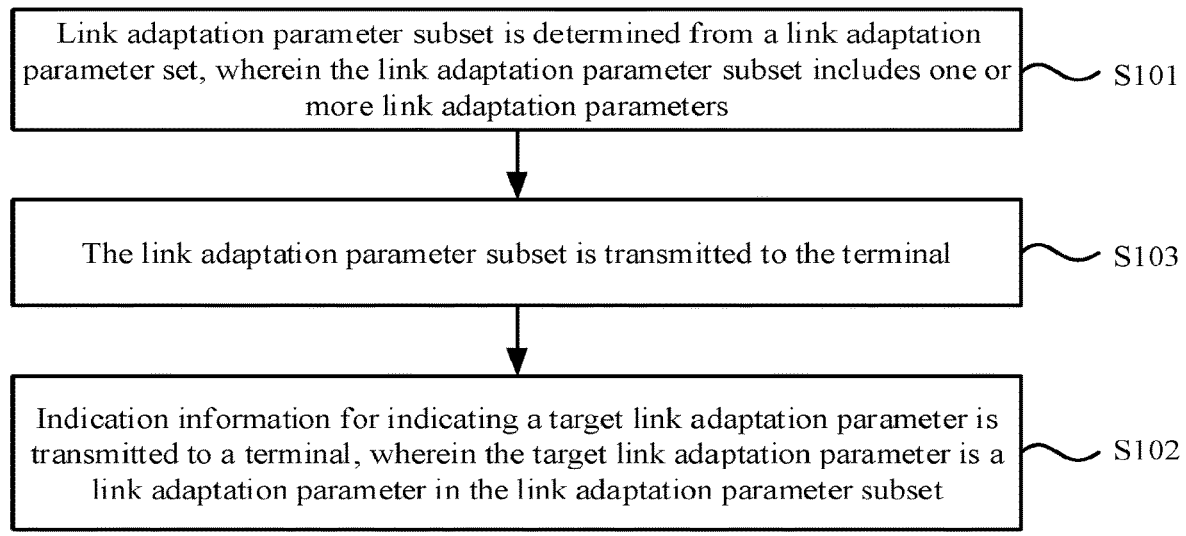
FIG. 2 is a schematic flowchart illustrating a method for indicating link adaptation parameters according to an embodiment of the present disclosure.

FIG. 2 is a schematic flowchart illustrating a method for indicating link adaptation parameters according to an embodiment of the present disclosure. As shown in FIG. 2, the method for indicating link adaptation parameters further includes, in step S103, the link adaptation parameter subset is transmitted to the terminal.

In one embodiment, the base station can transmit the determined link adaptation parameter to the terminal, so that the terminal can first determine in which range a target link adaptation parameter corresponding to the indication information needs to be determined after receiving the indication information transmitted by the base station.

It should be noted that the link adaptation parameter subset can be indicated to the terminal by the base station, or can be prestored by the terminal, which is not limited in the embodiments of the present disclosure. The link adaptation parameter subset in the embodiments of the present disclosure can be set as required.

Figure 3:
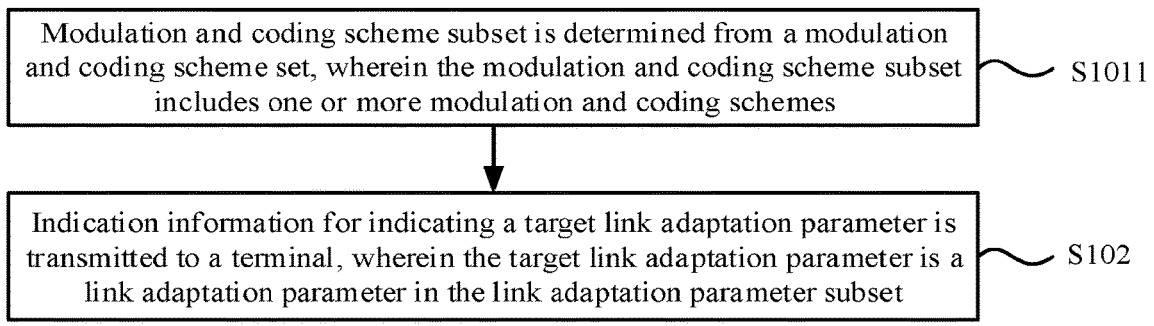
FIG. 3 is a schematic flowchart illustrating a method for indicating link adaptation parameters according to an embodiment of the present disclosure.

FIG. 3 is a schematic flowchart illustrating a method for indicating link adaptation parameters according to an embodiment of the present disclosure. As shown in FIG. 3, the link adaptation parameter includes a modulation and coding scheme, and determining the link adaptation parameter subset from the link adaptation parameter set includes, in step S1011, a modulation and coding scheme subset is determined from a modulation and coding scheme set, wherein the modulation and coding scheme subset includes one or more modulation and coding schemes.

In one embodiment, the link adaptation parameter can include the modulation and coding scheme, and the link adaptation parameter set is the modulation and coding scheme set. For example, the modulation and coding scheme set can include the above thirty-two modulation and coding schemes, and determining the link adaptation parameter subset from the link adaptation parameter set means determining the modulation and coding scheme subset from the modulation and coding scheme set. The specific number of modulation and coding schemes in the modulation and coding scheme subset can be determined according to the actual situation.

Figure 4:
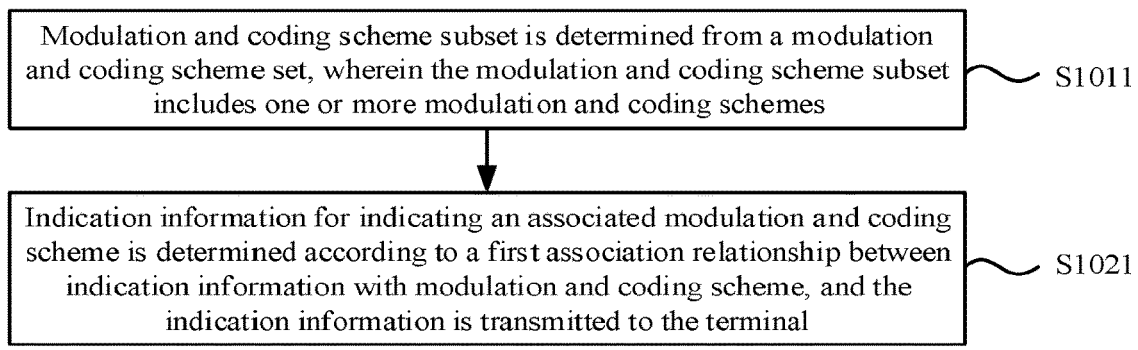
FIG. 4 is a schematic flowchart illustrating a method for indicating link adaptation parameters according to an embodiment of the present disclosure.

FIG. 4 is a schematic flowchart illustrating a method for indicating link adaptation parameters according to an embodiment of the present disclosure. As shown in FIG. 4, transmitting the indication information for indicating the target link adaptation parameter to the terminal includes, in step S1021, indication information for indicating an associated modulation and coding scheme is determined according to a first association relationship between indication information with modulation and coding scheme, and the indication information is transmitted to the terminal.

In all embodiments of the present disclosure, the first association relationship between indication information with modulation and coding scheme can be configured by the base station to the terminal, or determined according to a protocol, or respectively determined by the base station and the terminal based on the same determination method, or determined by the terminal through one or more parameters transmitted by the base station.

In one embodiment, the base station can prestore the first association relationship between indication information with modulation and coding scheme (that is, the above modulation and coding scheme subset). For example, the modulation and coding scheme subset includes four modulation and coding schemes, namely, MCS1 (a modulation and coding scheme corresponding to an index 1), MCS2 (a modulation and coding scheme corresponding to an index 2), MCS3 (a modulation and coding scheme corresponding to an index 3) and MCS6 (a modulation and coding scheme corresponding to an index 6), the indication information can be two bits, namely, "00", "01", "10" and "11", and then the first association relationship can be that MCS1 corresponds to "00", MCS2 corresponds to "0) 1", MCS3 corresponds to "10" and MCS6 corresponds to "11".

Further, the base station can determine indication information corresponding to a target modulation and coding scheme according to the first association relationship. For example, a target modulation and coding scheme is MCS2, it can be determined that the indication information corresponding to MCS2 is "01" according to the first association relationship, therefore, two-bit indication information "0) 1" can be generated and transmitted to the terminal.

It should be noted that the terminal can also prestore the above first association relationship, or receive the above first association relationship from the base station, therefore, after receiving the indication information "( )", the terminal can determine that the target modulation and coding scheme indicated by the indication information "01" is MCS2 according to the above first association relationship.

Figure 5:
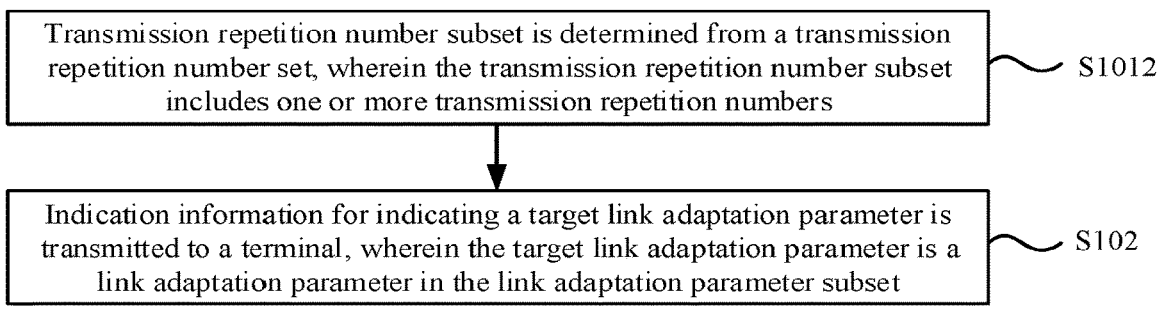
FIG. 5 is a schematic flowchart illustrating a method for indicating link adaptation parameters according to an embodiment of the present disclosure.

FIG. 5 is a schematic flowchart illustrating a method for indicating link adaptation parameters according to an embodiment of the present disclosure. As shown in FIG. 5, the link adaptation parameter includes a transmission repetition number of downlink information, and determining the link adaptation parameter subset from the link adaptation parameter set includes, in step S1012, a transmission repetition number subset is determined from a transmission repetition number set, wherein the transmission repetition number subset includes one or more transmission repetition numbers.

In one embodiment, the link adaptation parameter can include the transmission repetition number of downlink information, and the link adaptation parameter set is the transmission repetition number set. For example, it can be set that the transmission repetition number set can include four transmission repetition numbers, namely, R1, R2, R3 and R4 (numbers represented by R1 to R4 can be set as required), and determining the link adaptation parameter subset from the link adaptation parameter set means determining the transmission repetition number subset from the transmission repetition number set. The specific value of transmission repetition number in the transmission repetition number subset can be determined according to the actual situation.

Figure 6:
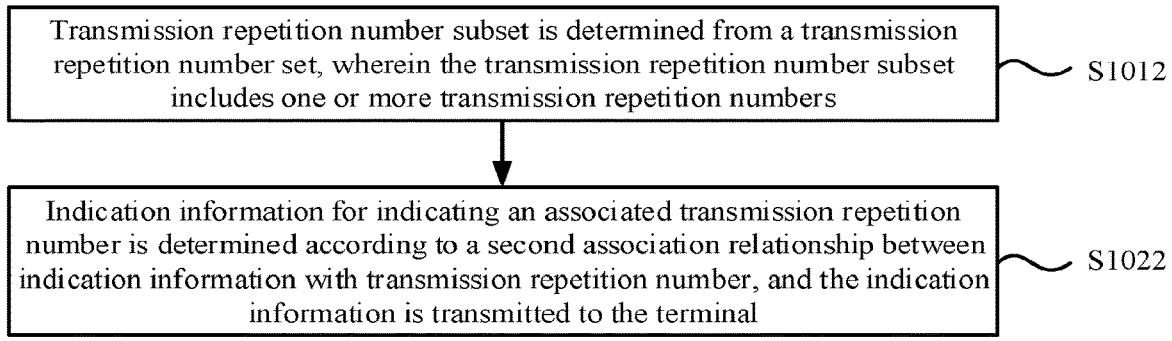
FIG. 6 is a schematic flowchart illustrating a method for indicating link adaptation parameters according to an embodiment of the present disclosure.

FIG. 6 is a schematic flowchart illustrating a method for indicating link adaptation parameters according to an embodiment of the present disclosure. As shown in FIG. 6, transmitting the indication information for indicating the target link adaptation parameter to the terminal includes, in step S1022, indication information for indicating an associated transmission repetition number is determined according to a second association relationship between indication information with transmission repetition number, and the indication information is transmitted to the terminal.

In all embodiments of the present disclosure, the second association relationship between indication information with transmission repetition number can be configured by the base station to the terminal, or determined according to a protocol, or respectively determined by the base station and the terminal based on the same determination method, or determined by the terminal through one or more parameters transmitted by the base station.

In one embodiment, the base station can prestore the second association relationship between indication information with transmission repetition number (that is, the above transmission repetition number subset). For example, the transmission repetition number subset can include two transmission repetition numbers, namely, R1 and R2, the indication information can be one bit, namely, "0" and "1", and then the second association relationship can be that R1 corresponds to "0" and R2 corresponds to "1".

Further, the base station can determine indication information corresponding to a target transmission repetition number according to the second association relationship. For example, a target transmission repetition number is R1, it can be determined that the indication information corresponding to R1 is "0" according to the above second association relationship, therefore, one-bit indication information "0" can be generated and transmitted to the terminal.

It should be noted that the terminal can also prestore the above second association relationship, or receive the above second association relationship from the base station, therefore, after receiving the indication information "0", the terminal can determine that the target transmission repetition number indicated by the indication information "0" is R1 according to the above second association relationship.

Figure 7:
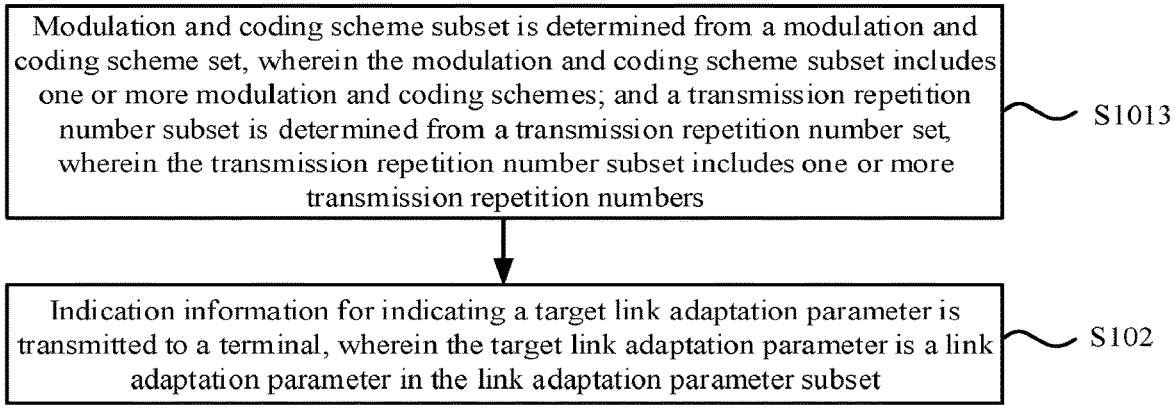
FIG. 7 is a schematic flowchart illustrating a method for indicating link adaptation parameters according to an embodiment of the present disclosure.

FIG. 7 is a schematic flowchart illustrating a method for indicating link adaptation parameters according to an embodiment of the present disclosure. As shown in FIG. 7, the link adaptation parameter includes a modulation and coding scheme and a transmission repetition number of downlink information, and determining the link adaptation parameter subset from the link adaptation parameter set includes, in step S1013, a modulation and coding scheme subset is determined from a modulation and coding scheme set, wherein the modulation and coding scheme subset includes one or more modulation and coding schemes; and a transmission repetition number subset is determined from a transmission repetition number set, wherein the transmission repetition number subset includes one or more transmission repetition numbers.

In one embodiment, the link adaptation parameter can include both the modulation and coding scheme and the transmission repetition number of downlink information, the link adaptation parameter set can be divided into two parts, one is the modulation and coding scheme set, and the other part is the transmission repetition number set, and then determining the link adaptation parameter subset from the link adaptation parameter set means determining the modulation and coding scheme subset from the modulation and coding scheme set, and determining the transmission repetition number subset from the transmission repetition number set.

Optionally, the indication information includes a first part for indicating a modulation and coding scheme and a second part for indicating a transmission repetition number out of a candidate transmission repetition number subset, wherein the candidate transmission repetition number subset is determined according to a third association relationship between transmission repetition number with modulation and coding scheme.

In one embodiment, in response to determining that the link adaptation parameter can include both the modulation and coding scheme and the transmission repetition number of downlink information, there may be an association relationship between modulation and coding scheme and transmission repetition number subset, which is called the third association relationship. For example, the association relationship between the above-mentioned MCS1, MCS2, MCS3 and MCS6 with transmission repetition numbers R1 to R4 can be shown in Table 1.

TABLE 1

| Modulation and coding scheme | One or more transmission repetition numbers |
|---|---|
| MCS1 | R1, R2 |
| MCS2 | R1, R2 |
| MCS3 | R3, R4 |
| MCS6 | R3, R4 |

It can be seen that transmission repetition numbers corresponding to MCS1 and MCS2 are both R1 and R2, and transmission repetition numbers corresponding to MCS3 and MCS6 are both R3 and R4.

The third association relationship can be transmitted by the base station to the terminal, or prestored by the terminal. After receiving the indication information, the terminal can determine a target modulation and coding scheme indicated by the indication information according to the prestored association relationship between indication information with modulation and coding scheme subset, and then determine a candidate transmission repetition number subset corresponding to the target modulation and coding scheme according to the third association relationship.

In all embodiments of the present disclosure, the third association relationship between transmission repetition number with modulation and coding scheme can be configured by the base station to the terminal, or determined according to a protocol, or respectively determined by the base station and the terminal based on the same determination method, or determined by the terminal through one or more parameters transmitted by the base station.

The indication information can include two parts, the first part of the indication information is configured to indicate the modulation and coding scheme, and the second part of the indication information is configured to indicate the transmission repetition number. For example, the indication information includes three bits, namely, "011", where the first two bits are used as the first part of the indication information to indicate the modulation and coding scheme, and the last bit is used as the second part of the indication information to indicate the transmission repetition number. For example, a modulation and coding scheme determined according to "01" can be MCS1, and then one or more transmission repetition numbers corresponding to MCS1 can be inquired as R1 and R2 according to the third association relationship.

The terminal can also receive an association relationship between indication information with candidate transmission repetition number subset from the base station, or prestore the association relationship between indication information with candidate transmission repetition number subset. It should be noted that the association relationship between indication information with candidate transmission repetition number subset here can be different from the second association relationship in the above embodiment, wherein a plurality of transmission repetition numbers in the candidate transmission repetition number subset can be sorted according to a specific rule, for example, from small to large, and the association relationship between indication information with plurality of transmission repetition numbers here can be an association relationship between indication information with transmission repetition number in a specific order.

For example, the candidate transmission repetition number subset includes two candidate transmission repetition numbers R1 and R2. In R1 and R2, R1 is smaller, R2 is larger, and R1 ranks before R2. The third association relationship means that the indication information "0" is associated with a top-ranked transmission repetition number, and the indication information "1" is associated with a low-ranked transmission repetition number. In response to determining that the last bit the last bit in the indication information is "1", it can be determined that the transmission repetition number associated with the indication information is R2. Therefore, the terminal can accurately determine the modulation and coding scheme and the transmission repetition number.

Figure 8:
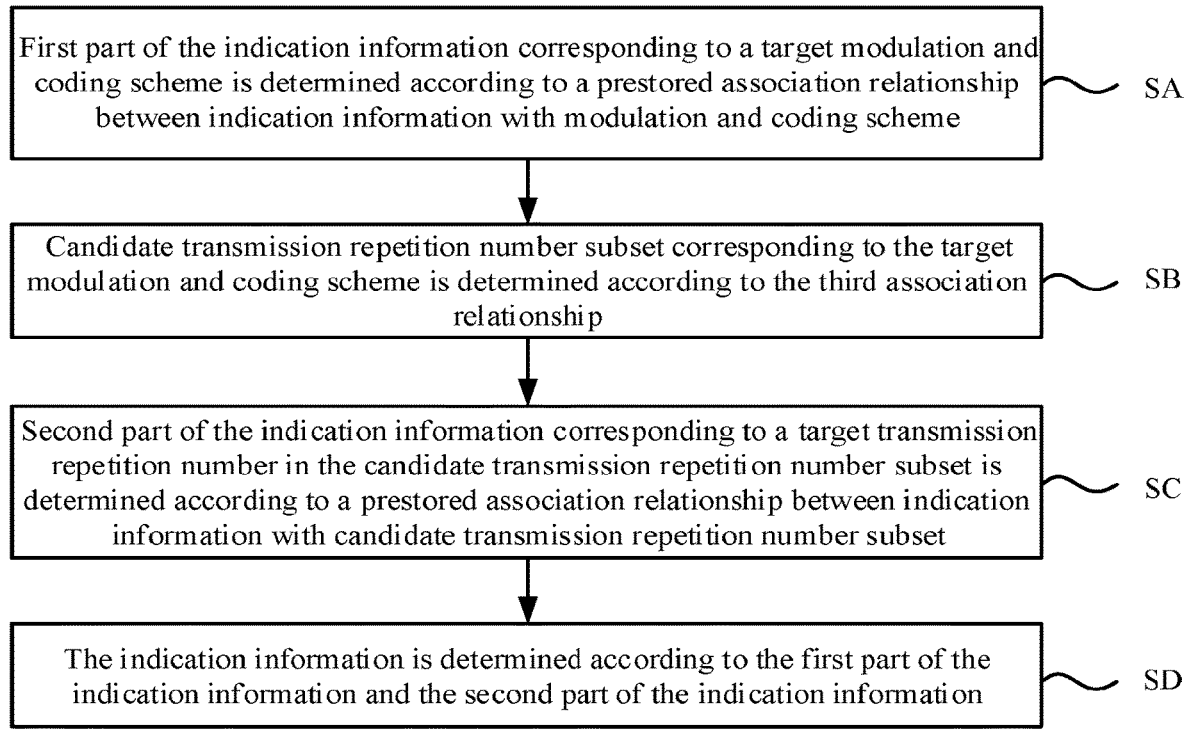
FIG. 8 is a schematic flowchart illustrating a method for determining indication information according to an embodiment of the present disclosure.

FIG. 8 is a schematic flowchart illustrating a method for determining indication information according to an embodiment of the present disclosure. As shown in FIG. 8, the indication information can be determined in following steps:

in step SA, a first part of the indication information corresponding to a target modulation and coding scheme is determined according to a prestored association relationship between indication information with modulation and coding scheme:

in step SB, a candidate transmission repetition number subset corresponding to the target modulation and coding scheme is determined according to the third association relationship:

in step SC, a second part of the indication information corresponding to a target transmission repetition number in the candidate transmission repetition number subset is determined according to a prestored association relationship between indication information with candidate transmission repetition number subset; and in step SD, the indication information is determined according to the first part of the indication information and the second part of the indication information.

In one embodiment, when the indication information is determined by the base station according to the target link adaptation parameter, it is also necessary to consider the third association relationship.

In detail, the first part of the indication information corresponding to the target modulation and coding scheme can be determined according to the prestored association relationship between indication information with modulation and coding scheme subset. For example, the target modulation and coding scheme is MCS2, and the first part of the indication information corresponding to MCS2 is "01".

Further, the candidate transmission repetition number subset corresponding to the target modulation and coding scheme can be determined according to the third association relationship. For example, it can be seen from the above Table 1, the candidate transmission repetition number subset corresponding to MCS2 is a subset composed of R1 and R2. Next, the second part of the indication information corresponding to the target transmission repetition number in the candidate transmission repetition number subset can be determined according to a prestored association relationship between indication information with candidate transmission repetition number subset. For example, the target transmission repetition number is R2, which corresponds to a low-ranked transmission repeating time in the candidate transmission repetition number subset, and then the generated second part of the indication information can be "1".

Finally, the indication information is determined according to the first part of the indication information and the second part of the indication information. For example, the first part of the indication information is "01", the second part of the indication information is "1", and then the determined indication information is "011".

Figure 9:
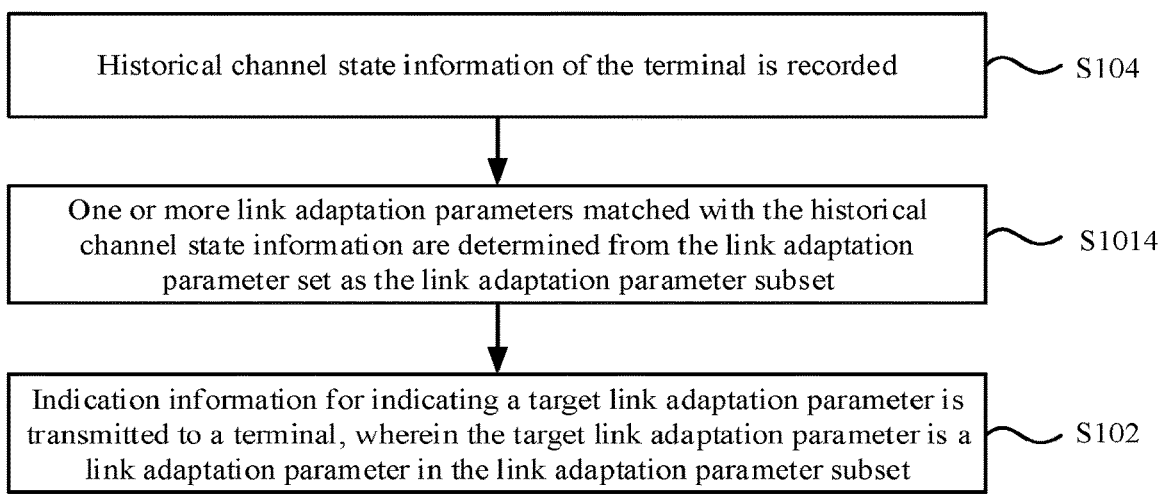
FIG. 9 is a schematic flowchart illustrating a method for indicating link adaptation parameters according to an embodiment of the present disclosure.

FIG. 9 is a schematic flowchart illustrating a method for indicating link adaptation parameters according to an embodiment of the present disclosure. As shown in FIG. 9, the method for indicating link adaptation parameters further includes:

in step S104, historical channel state information of the terminal is recorded:
wherein determining the link adaptation parameter subset from the link adaptation parameter set includes:
in step S1014, one or more link adaptation parameters matched with the historical channel state information are determined from the link adaptation parameter set as the link adaptation parameter subset.

In one embodiment, the base station can record the historical channel state information of the terminal, and the way in which the base station determines the channel state information of the terminal can be selected according to the needs. For example, the channel state information can be actively reported by the terminal, or analyzed by the base station according to the uplink data from the terminal, which is not limited by the present disclosure.

A channel state will affect a communication link between the base station and the terminal, therefore, when determining the link adaptation parameter subset from the link adaptation parameter set, one or more link adaptation parameters matched with the historical channel state information can be determined as the link adaptation parameter subset, so that the base station can subsequently select a target link adaptation parameter from the one or more link adaptation parameters matched with the historical channel state information to indicate to the terminal, and ensure that the selected target link adaptation parameter is also matched with the historical channel state information, therefore, the terminal can communicate well with the base station in its channel state based on the indicated target link adaptation parameter.

Figure 10:
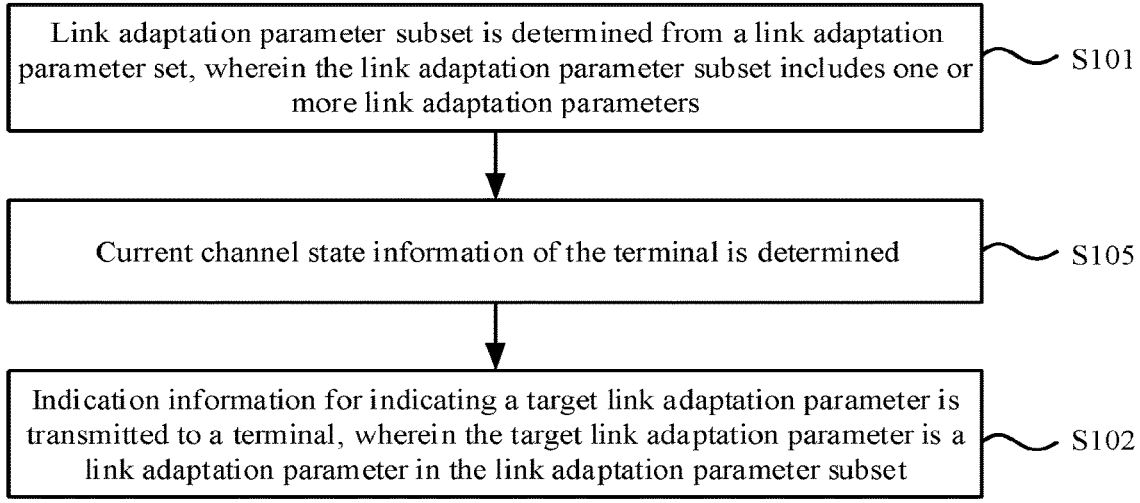
FIG. 10 is a schematic flowchart illustrating a method for indicating link adaptation parameters according to an embodiment of the present disclosure.

FIG. 10 is a schematic flowchart illustrating a method for indicating link adaptation parameters according to an embodiment of the present disclosure. As shown in FIG. 10, before determining a target link adaptation parameter in the one or more link adaptation parameters, the method for indicating link adaptation parameters further includes, in step S105, current channel state information of the terminal is determined, wherein the target link adaptation parameter is a link adaptation parameter in the link adaptation parameter subset which matches with the current channel state information.

In one embodiment, the channel state will affect the communication link between the base station and the terminal, therefore, when determining a target link adaptation parameter in the link adaptation parameter subset, the target link adaptation parameter matching with the current state information can be determined, so as to ensure that the terminal can communicate well with the base station in its channel state based on the indicated target link adaptation parameter.

Figure 11:
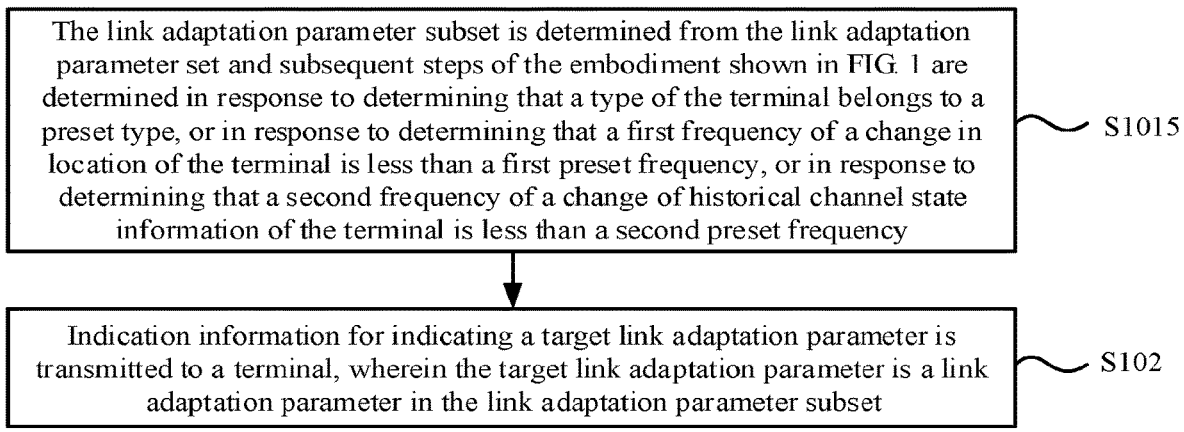
FIG. 11 is a schematic flowchart illustrating a method for indicating link adaptation parameters according to an embodiment of the present disclosure.

FIG. 11 is a schematic flowchart illustrating a method for indicating link adaptation parameters according to an embodiment of the present disclosure. As shown in FIG. 11, determining the link adaptation parameter subset from the link adaptation parameter set includes, in step S1015, the link adaptation parameter subset is determined from the link adaptation parameter set and subsequent steps of the embodiment shown in FIG. 1 are determined in response to determining that a type of the terminal belongs to a preset type, or in response to determining that a first frequency of a change in location of the terminal is less than a first preset frequency, or in response to determining that a second frequency of a change of historical channel state information of the terminal is less than a second preset frequency.

In one embodiment, the base station can first determine the type of the terminal, and determine whether the steps in the embodiment shown in FIG. 1 need to be performed according to whether the type of the terminal belongs to a preset type. The type of the terminal can be reported to the base station by the terminal itself, or obtained by the base station from a core network, which can be selected according to the needs.

Since use location of a preset type of the terminal is relatively fixed, for example, an industrial sensor, the channel state information of the terminal is almost unchanged, it is unnecessary to change the link adaptation parameter indicated for the terminal greatly. For such a terminal, that is, a terminal belonging to the preset type, the steps in the embodiment shown in FIG. 1 can be performed: while for a terminal not belonging to the preset type, the target link adaptation parameter can be directly determined in the link adaptation parameter set.

In one embodiment, the base station can first determine a first frequency of a change in location of the terminal, and determine whether the steps in the embodiment shown in FIG. 1 need to be performed according to the first frequency. The first frequency of the change in location of the terminal can be reported to the base station by the terminal itself, or obtained by the base station in other ways, which can be selected according to the needs.

Based on the first frequency of the change in location of the terminal, it can be determined whether the use location of the terminal is relatively fixed. If the first frequency is less than a first preset frequency, it can be determined that the location of the terminal is relatively fixed, and channel state information of the terminal is almost unchanged, it is unnecessary to change the link adaptation parameter indicated for the terminal greatly, therefore, for this terminal, the steps in the embodiment shown in FIG. 1 can be performed; and if the first frequency is greater than or equal to the first preset frequency, the target link adaptation parameter can be directly determined in the link adaptation parameter set.

In one embodiment, the base station can first determine a second frequency of a change of historical channel state information of the terminal, and determine whether the steps in the embodiment shown in FIG. 1 need to be performed according to the second frequency. The second frequency of the change of the historical channel state information of the terminal can be reported to the base station by the terminal itself, or obtained by the base station in other ways, which can be selected according to the needs.

Based on the second frequency of the change of the historical channel state information of the terminal, it can be determined whether the channel state of the terminal is relatively fixed. If the second frequency is less than a second preset frequency, it can be determined that the channel state information of the terminal is almost unchanged, it is unnecessary to change the link adaptation parameter indicated for the terminal greatly, therefore, for this terminal, the steps in the embodiment shown in FIG. 1 can be performed;

and if the second frequency is greater than or equal to the second preset frequency, the target link adaptation parameter can be directly determined in the link adaptation parameter set.

Optionally, the link adaptation parameter subset includes a plurality of continuous link adaptation parameters in the link adaptation parameter set, or a plurality of discontinuous link adaptation parameters in the link adaptation parameter set.

In one embodiment, the link adaptation parameter subset determined in the link adaptation parameter set can be the plurality of continuous link adaptation parameters in the link adaptation parameter set, or the plurality of discontinuous link adaptation parameters in the link adaptation parameter set.

Taking a plurality of link adaptation parameters including a plurality of modulation and coding schemes as an example, for example, the modulation and coding scheme set is shown in Table 2.

TABLE 2

| Index | Modulation order | Target code rate | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| ... | ... | ... | ... |
| 29 | 2 | reserved | reserved |
| 30 | 4 | reserved | reserved |
| 31 | 6 | reserved | reserved |

In Table 2, MCS0 to MCS31 are included, that is, there are thirty-two modulation and coding schemes, and the modulation and coding scheme subset can be four continuous modulation and coding schemes in thirty-two modulation and coding schemes, for example, MCS2, MCS3, MCS4 and MCS5: or can also be four discontinuous modulation and coding schemes in thirty-two modulation and coding schemes, for example, MCS1, MCS2, MCS3 and MCS6. The modulation and coding scheme subset can be specifically set according to the needs, and can also be determined according to the historical channel state information of the terminal.

Figure 12:
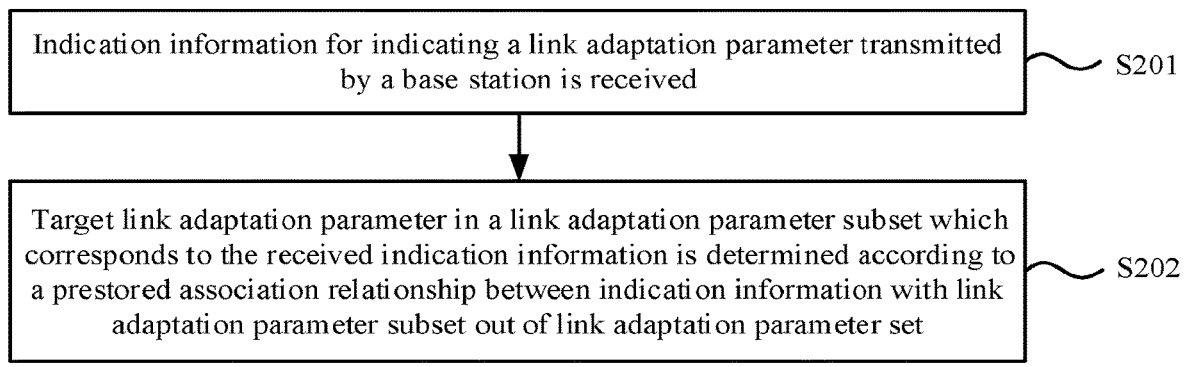
FIG. 12 is a schematic flowchart illustrating a method for determining link adaptation parameters according to an embodiment of the present disclosure.

FIG. 12 is a schematic flowchart illustrating a method for determining link adaptation parameters according to an embodiment of the present disclosure. The method for determining link adaptation parameters shown in this embodiment can be applied to a terminal, which can be used as user equipment to communicate with the base station (such as the 5G NR base station and the 4G LTE base station) described in the above embodiment. The terminal includes, but is not limited to, a mobile phone, a tablet computer, a wearable device, a personal computer, intelligent furniture, an industrial sensor, and the like. The type of the terminal can be an NR-lite terminal.

As shown in FIG. 12, the method for determining link adaptation parameters can include following steps, in step S201, indication information for indicating a link adaptation parameter transmitted by a base station is received, and in step S202, a target link adaptation parameter in a link adaptation parameter subset which corresponds to the received indication information is determined according to a prestored association relationship between indication information with link adaptation parameter subset out of link adaptation parameter set.

In one embodiment, the base station does not have to determine the target link adaptation parameter to be indicated in the link adaptation parameter set to the terminal, but can determine the link adaptation parameter subset from the link adaptation parameter set, and then select the target link adaptation parameter in the link adaptation parameter subset to indicate to the terminal.

Before receiving the indication information, the terminal has already stored the association relationship between indication information with link adaptation parameter subset in the link adaptation parameter set, therefore, after receiving the indication information, the terminal can determine the target link adaptation parameter corresponding to the indication information in the link adaptation parameter included in the link adaptation parameter subset according to the prestored association relationship between indication information with link adaptation parameter subset determined from the link adaptation parameter set, that is, the target link adaptation parameter indicated by the base station can be determined.

For example, the link adaptation parameter is a modulation and coding scheme. A target link adaptation parameter indicated by the base station is MCS2, and an association relationship between indication information with link adaptation parameter subset determined from the link adaptation parameter set prestored by the terminal is that MCS1 corresponds to indication information "00", MCS2 corresponds to indication information "01", MCS3 corresponds to indication information "10" and MCS6 corresponds to indication information "11". If the received indication information is "01", it can be determined that a target modulation and coding scheme indicated by the base station is MCS2.

Figure 13:
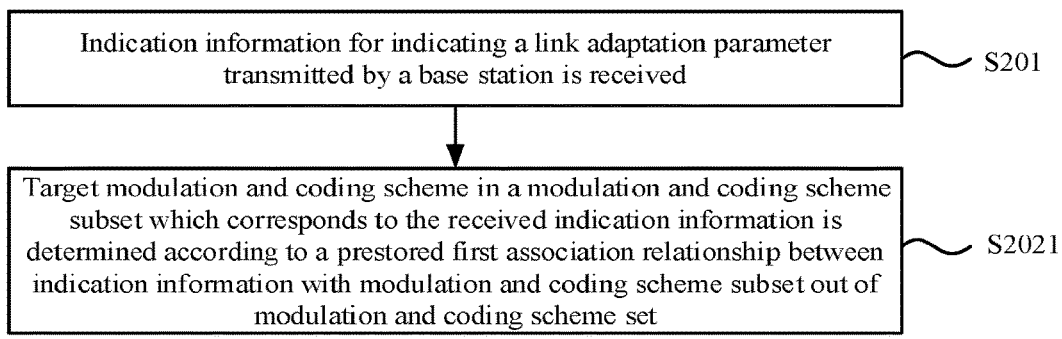
FIG. 13 is a schematic flowchart illustrating a method for determining link adaptation parameters according to an embodiment of the present disclosure.

FIG. 13 is a schematic flowchart illustrating a method for determining link adaptation parameters according to an embodiment of the present disclosure. As shown in FIG. 13, the link adaptation parameter includes a modulation and coding scheme, and determining, according to the prestored association relationship between indication information with link adaptation parameter subset out of link adaptation parameter set, the target link adaptation parameter in the link adaptation parameter subset which corresponds to the received indication information includes, in step S2021, a target modulation and coding scheme in a modulation and coding scheme subset which corresponds to the received indication information is determined according to a prestored first association relationship between indication information with modulation and coding scheme subset out of modulation and coding scheme set.

In one embodiment, in response to determining that the link adaptation parameter includes the modulation and coding scheme, the terminal can prestore first association relationship between indication information with modulation and coding scheme subset out of modulation and coding scheme set, and then determine the target modulation and coding scheme in the modulation and coding scheme subset which corresponds to the received indication information according to the first association relationship.

Figure 14:
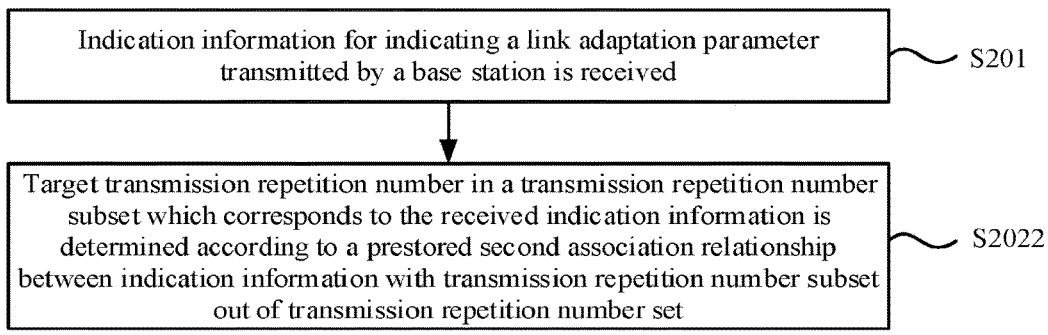
FIG. 14 is a schematic flowchart illustrating a method for determining link adaptation parameters according to an embodiment of the present disclosure.

FIG. 14 is a schematic flowchart illustrating a method for determining link adaptation parameters according to an embodiment of the present disclosure. As shown in FIG. 14, the link adaptation parameter includes a transmission repetition number of downlink information, and determining, according to the prestored association relationship between indication information with link adaptation parameter subset out of link adaptation parameter set, the target link adaptation parameter in the link adaptation parameter subset which corresponds to the received indication information includes, in step S2022, a target transmission repetition number in a transmission repetition number subset which corresponds to the received indication information is determined according to a prestored second association relationship between indication information with transmission repetition number subset out of transmission repetition number set.

In one embodiment, in response to determining that the link adaptation parameter includes the transmission repetition number, the terminal can prestore the second association relationship between indication information with transmission repetition number subset out of transmission repetition number set, and then determine the target transmission repetition number in the transmission repetition number subset which corresponds to the received indication information according to the second association relationship.

Figure 15:
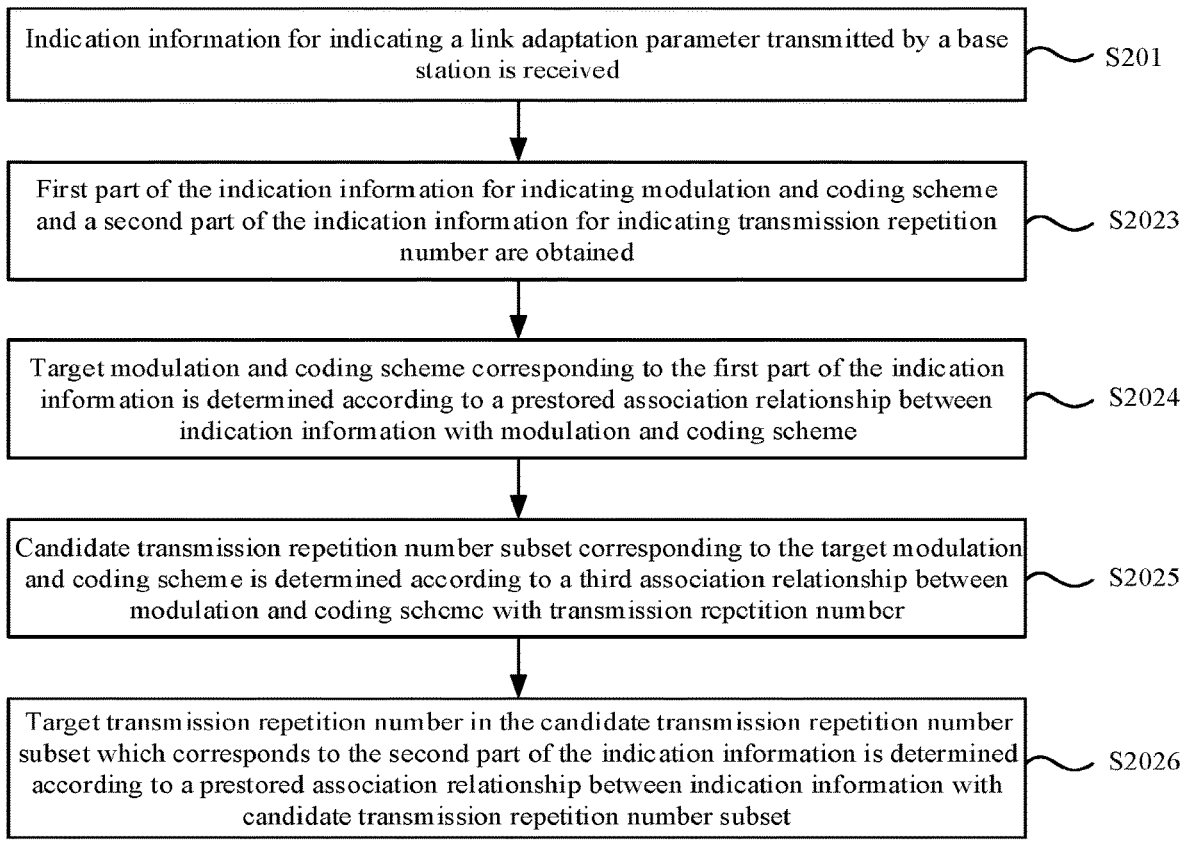
FIG. 15 is a schematic flowchart illustrating a method for determining link adaptation parameters according to an embodiment of the present disclosure.

FIG. 15 is a schematic flowchart illustrating a method for determining link adaptation parameters according to an embodiment of the present disclosure. As shown in FIG. 15, the link adaptation parameter includes a modulation and coding scheme and a transmission repetition number of downlink information, and determining, according to the prestored association relationship between indication information with link adaptation parameter subset out of link adaptation parameter set, the target link adaptation parameter in the link adaptation parameter subset which corresponds to the received indication information includes:

in step S2023, a first part of the indication information for indicating modulation and coding scheme and a second part of the indication information for indicating transmission repetition number are obtained:

in step S2024, a target modulation and coding scheme corresponding to the first part of the indication information is determined according to a prestored association relationship between indication information with modulation and coding scheme:

in step S2025, a candidate transmission repetition number subset corresponding to the target modulation and coding scheme is determined according to a third association relationship between modulation and coding scheme with transmission repetition number; and in step S2026, a target transmission repetition number in the candidate transmission repetition number subset which corresponds to the second part of the indication information is determined according to a prestored association relationship between indication information with candidate transmission repetition number subset.

In one embodiment, in response to determining that the link adaptation parameter can include both the modulation and coding scheme and the transmission repetition number of downlink information, there may be an association relationship between modulation and coding scheme and transmission repetition number, which is called the third association relationship. For example, the modulation and coding scheme includes MCS1, MCS2, MCS3 and MCS6, the transmission repetition number includes R1, R2, R3 and R4, and the association relationship between MCS1, MCS2, MCS3 and MCS6 with transmission repeating times R1 to R4 can be shown in the above Table 1.

The terminal can receive the third association relationship transmitted by the base station, or prestore the third association relationship. After receiving the indication information, the terminal can determine the modulation and coding scheme indicated by the indication information according to the prestored association relationship between indication information with modulation and coding scheme. The indication information can include two parts, the first part of the indication information is configured to indicate the modulation and coding scheme, and the second part of the indication information is configured to indicate the transmission repetition number.

For example, the indication information includes three bits, namely, "011", where the first two bits are used as the first part of the indication information to indicate the modulation and coding scheme, and the last bit is used as the second part of the indication information to indicate the transmission repetition number. For example, a modulation and coding scheme determined according to "01" can be MCS1, and then the candidate transmission repetition number subset corresponding to MCS1 can be inquired as R1 and R2 according to the third association relationship.

The terminal can also prestore the association relationship between indication information with transmission repetition number, a plurality of transmission repetition numbers in the transmission repetition number subset can be sorted according to a specific rule, for example, from small to large, and the association relationship between indication information with transmission repetition number here can be an association relationship between indication information with transmission repetition number in a specific order.

For example, in one or more transmission repetition numbers R1 and R2, R1 is smaller, R2 is larger, and R1 ranks before R2. The third association relationship means that the indication information "0" is associated with a top-ranked transmission repetition number, and the indication information "1" is associated with a low-ranked transmission repetition number. In response to determining that the last bit the last bit in the indication information is "1", it can be determined that the transmission repetition number associated with the indication information is R2. Therefore, the terminal can accurately determine the modulation and coding scheme and the transmission repetition number.

Corresponding to the aforementioned embodiments of the method for indicating link adaptation parameters and the method for determining link adaptation parameters, the present disclosure further provides embodiments of an apparatus for indicating link adaptation parameters and an apparatus for determining link adaptation parameters.

Figure 16:
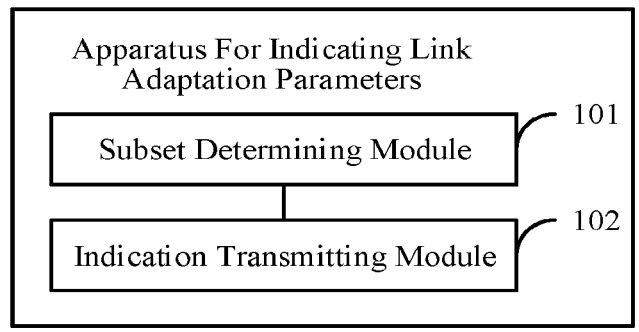
FIG. 16 is a schematic block diagram illustrating an apparatus for indicating link adaptation parameters according to an embodiment of the present disclosure.

FIG. 16 is a schematic block diagram illustrating an apparatus for indicating link adaptation parameters according to an embodiment of the present disclosure. The apparatus for indicating link adaptation parameters shown in this embodiment can be applied to a base station such as a 5G NR base station and a 4G LTE base station. The base station can communicate with a terminal as user equipment. The terminal includes, but is not limited to, a mobile phone, a tablet computer, a wearable device, a personal computer, intelligent furniture, an industrial sensor, and the like. The type of the terminal can be an NR-lite terminal.

As shown in FIG. 16, the apparatus for indicating link adaptation parameters can include a subset determining module 101 configured to determine a link adaptation parameter subset from a link adaptation parameter set, wherein the link adaptation parameter subset includes one or more link adaptation parameters, and an indication transmitting module 102 configured to transmit indication information for indicating a target link adaptation parameter to a terminal, wherein the target link adaptation parameter is a link adaptation parameter in the link adaptation parameter subset.

Figure 17:
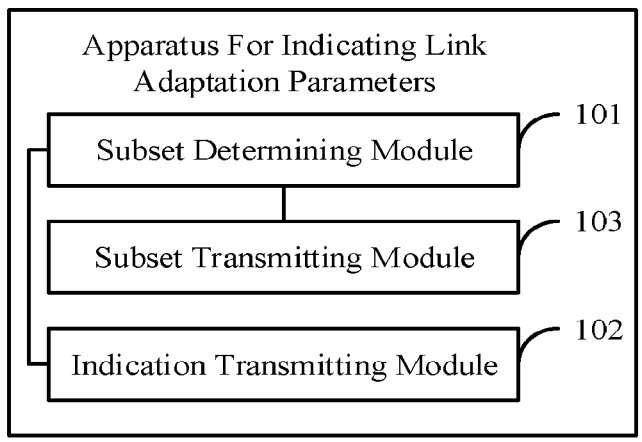
FIG. 17 is a schematic block diagram illustrating an apparatus for indicating link adaptation parameters according to an embodiment of the present disclosure.

FIG. 17 is a schematic block diagram illustrating an apparatus for indicating link adaptation parameters according to an embodiment of the present disclosure. As shown in FIG. 17, the apparatus for indicating link adaptation parameters further includes a subset transmitting module 103 configured to transmit the link adaptation parameter subset to the terminal.

Optionally, the link adaptation parameter includes a modulation and coding scheme, the subset determining module 101 is configured to determine a modulation and coding scheme subset from a modulation and coding scheme set, wherein the modulation and coding scheme subset includes one or more modulation and coding schemes.

Optionally, the indication transmitting module 102 is configured to determine indication information for indicating an associated modulation and coding scheme according to a first association relationship between indication information with modulation and coding scheme, and transmit the indication information to the terminal.

Optionally, the link adaptation parameter includes a transmission repetition number of downlink information, the subset determining module 101 is configured to determine a transmission repetition number subset from a transmission repetition number set, wherein the transmission repetition number subset includes one or more transmission repetition numbers.

Optionally, the indication transmitting module 102 is configured to determine indication information for indicating an associated transmission repetition number according to a second association relationship between indication information with transmission repetition number, and transmit the indication information to the terminal.

Optionally, the link adaptation parameter includes a modulation and coding scheme and a transmission repetition number of downlink information, the subset determining module 101 is configured to determine a modulation and coding scheme subset from a modulation and coding scheme set, wherein the modulation and coding scheme subset includes one or more modulation and coding schemes; and determine a transmission repetition number subset from a transmission repetition number set, wherein the transmission repetition number subset includes one or more transmission repetition numbers.

Optionally, the indication information includes a first part for indicating a modulation and coding scheme and a second part for indicating a transmission repetition number out of a candidate transmission repetition number subset, wherein the candidate transmission repetition number subset is determined according to a third association relationship between transmission repetition number with modulation and coding scheme.

Figure 18:
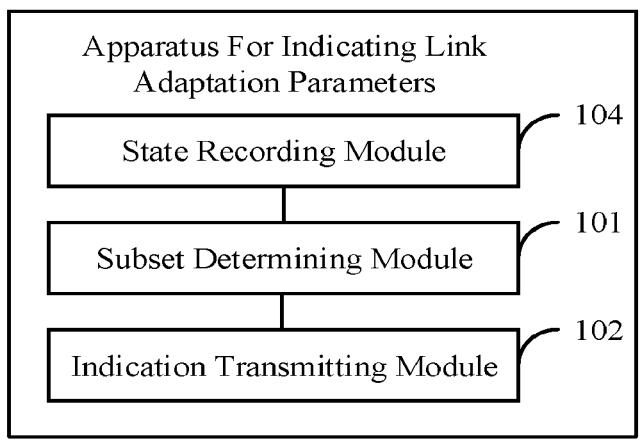
FIG. 18 is a schematic block diagram illustrating an apparatus for indicating link adaptation parameters according to an embodiment of the present disclosure.

FIG. 18 is a schematic block diagram illustrating an apparatus for indicating link adaptation parameters according to an embodiment of the present disclosure. As shown in FIG. 18, the apparatus for indicating link adaptation parameters further includes a state recording module 104 configured to record historical channel state information of the terminal, wherein the subset determining module 101 is configured to determine, from the link adaptation parameter set, one or more link adaptation parameters matched with the historical channel state information as the link adaptation parameter subset.

Figure 19:
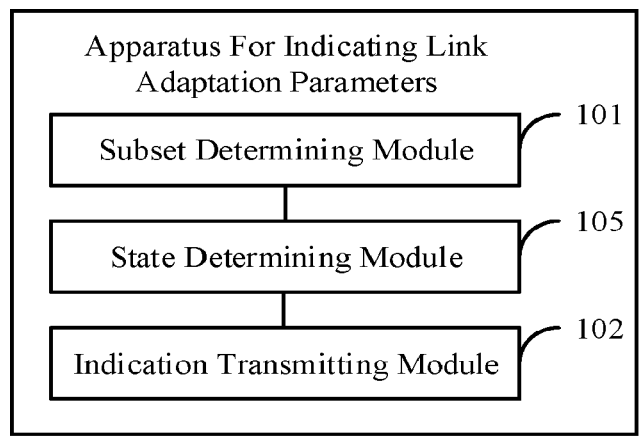
FIG. 19 is a schematic block diagram illustrating an apparatus for indicating link adaptation parameters according to an embodiment of the present disclosure.

FIG. 19 is a schematic block diagram illustrating an apparatus for indicating link adaptation parameters according to an embodiment of the present disclosure. As shown in FIG. 19, before determining the target link adaptation parameter in the one or more link adaptation parameters, the apparatus for indicating link adaptation parameters further includes a state determining module 105 configured to determine current channel state information of the terminal, wherein the target link adaptation parameter is a link adaptation parameter in the link adaptation parameter subset which matches with the current channel state information.

Optionally, the subset determining module 101 is configured to determine the link adaptation parameter subset from the link adaptation parameter set in response to determining that the terminal belongs to a preset type, or in response to determining that a location of the terminal is changing with a first frequency less than a first preset frequency, or in response to determining that historical channel state information of the terminal is changing with a second frequency less than a second preset frequency. Optionally, the link adaptation parameter subset includes a plurality of continuous link adaptation parameters in the link adaptation parameter set, or a plurality of discontinuous link adaptation parameters in the link adaptation parameter set.

Figure 20:
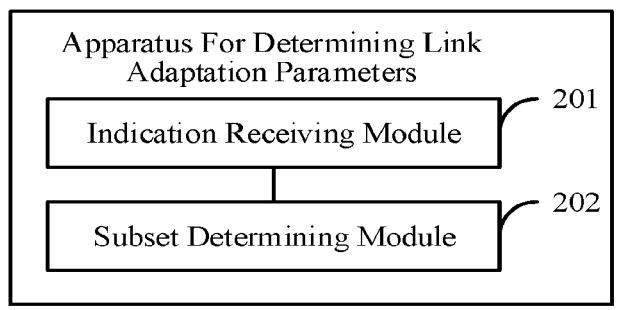
FIG. 20 is a schematic block diagram illustrating an apparatus for determining link adaptation parameters according to an embodiment of the present disclosure.

FIG. 20 is a schematic block diagram illustrating an apparatus for determining link adaptation parameters according to an embodiment of the present disclosure. The apparatus for determining link adaptation parameters shown in this embodiment can be applied to a terminal. The terminal can be used as user equipment to communicate with the base station (for example, a 5G NR base station and a 4G LTE base station) described in the above embodiment. The terminal includes, but is not limited to, a mobile phone, a tablet computer, a wearable device, a personal computer, intelligent furniture, an industrial sensor, and the like. The type of the terminal can be an NR-lite terminal.

As shown in FIG. 20, the apparatus for determining link adaptation parameters can include an indication receiving module 201 configured to receive indication information for indicating a link adaptation parameter transmitted by a base station, and a subset determining module 202 configured to determine, according to a prestored association relationship between indication information with link adaptation parameter subset out of link adaptation parameter set, a target link adaptation parameter in a link adaptation parameter subset which corresponds to the received indication information.

Optionally, the link adaptation parameter includes a modulation and coding scheme, the subset determining module 202 is configured to determine, according to a prestored first association relationship between indication information with modulation and coding scheme subset out of modulation and coding scheme set, a target modulation and coding scheme in a modulation and coding scheme subset which corresponds to the received indication information.

Optionally, the link adaptation parameter includes a transmission repetition number of downlink information, the subset determining module 202 is configured to determine, according to a prestored second association relationship between indication information with transmission repetition number subset out of transmission repetition number set, a target transmission repetition number in a transmission repetition number subset which corresponds to the received indication information.

Figure 21:
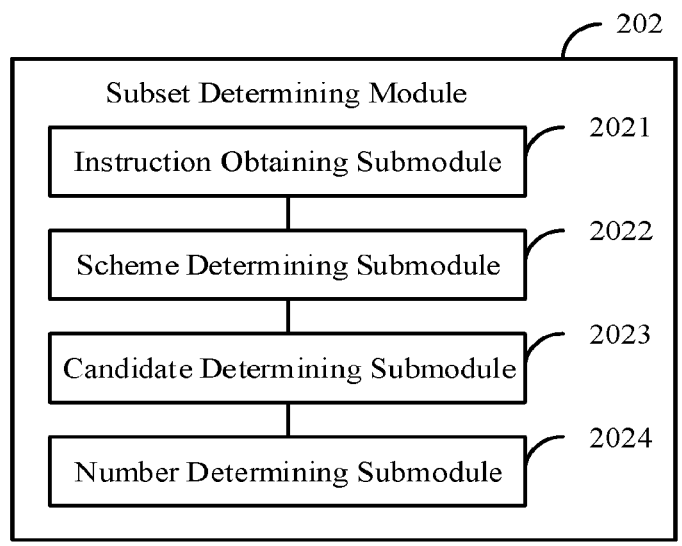
FIG. 21 is a schematic block diagram illustrating a subset determining module according to an embodiment of the present disclosure.

FIG. 21 is a schematic block diagram illustrating a subset determining module according to an embodiment of the present disclosure. As shown in FIG. 21, the link adaptation parameter includes a modulation and coding scheme and a transmission repetition number of downlink information, and the subset determining module 202 includes an instruction obtaining submodule 2021 configured to obtain a first part of the indication information for indicating modulation and coding scheme and a second part of the indication information for indicating transmission repetition number, and a scheme determining submodule 2022 configured to determine, according to a prestored association relationship between indication information with modulation and coding scheme, a target modulation and coding scheme corresponding to the first part of the indication information. The subset determining module 202 can further include a candidate determining submodule 2023 configured to determine, according to a third association relationship between modulation and coding scheme with transmission repetition number, a candidate transmission repetition number subset corresponding to the target modulation and coding scheme and a number determining submodule 2024 configured to determine, according to a prestored association relationship between indication information with candidate transmission repetition number subset, a target transmission repetition number in the candidate transmission repetition number subset which corresponds to the second part of the indication information.

Regarding the apparatus in the above embodiment, the specific manner in which each module performs the operation has been described in detail in the embodiment of the method, which will not be elaborated here.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the objectives of the solutions of the present disclosure. Those skilled in the art may understand and implement without creative labor.

According to the embodiments of the present disclosure, there is provided an electronic device, including a processor and a memory for storing instructions executable by the processor. The processor is configured to implement the steps of the method for indicating link adaptation parameters described in any of the above embodiments.

According to the embodiments of the present disclosure, there is provided an electronic device, including a processor, and a memory for storing instructions executable by the processor. The processor is configured to implement the steps of the method for determining link adaptation parameters described in any of the above embodiments.

According to the embodiments of the present disclosure, there is provided a computer readable storage medium storing a computer program, wherein the computer program, when executed by a processor, causing the processor to implement the steps of the method for indicating link adaptation parameters described in any of the above embodiments.

According to the embodiments of the present disclosure, there is provided a computer readable storage medium storing a computer program, wherein the computer program, when executed by a processor, causing the processor to implement the steps of the method for determining link adaptation parameters described in any of the above embodiments.

Figure 22:
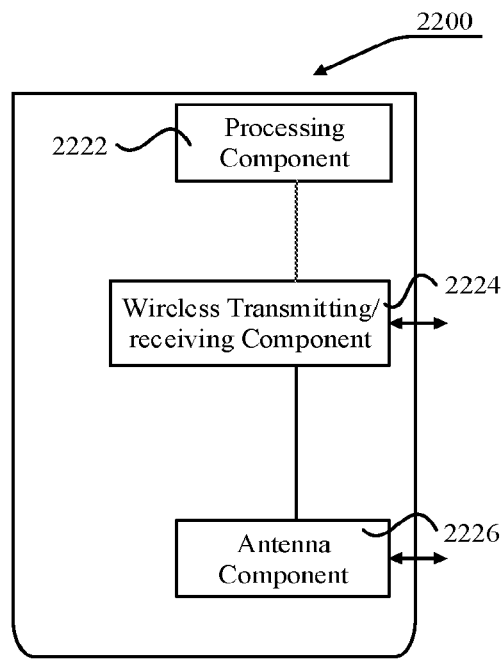
FIG. 22 is a schematic block diagram illustrating an apparatus for determining link adaptation parameters according to an embodiment of the present disclosure.

As shown in FIG. 22, FIG. 22 is a schematic block diagram illustrating an apparatus 2200 for determining link adaptation parameters according to an embodiment of the present disclosure. The apparatus 2200 can be provided as a base station. Referring to FIG. 22, the apparatus 2200 includes a processing component 2222, a wireless transmitting/receiving component 2224, an antenna component 2226 and a signal processing part specific to a wireless interface. The processing component 2222 can further include one or more processors. One of the processors in the processing component 2222 can be configured to implement the method for determining link adaptation parameters described in any of the above embodiments.

Figure 23:
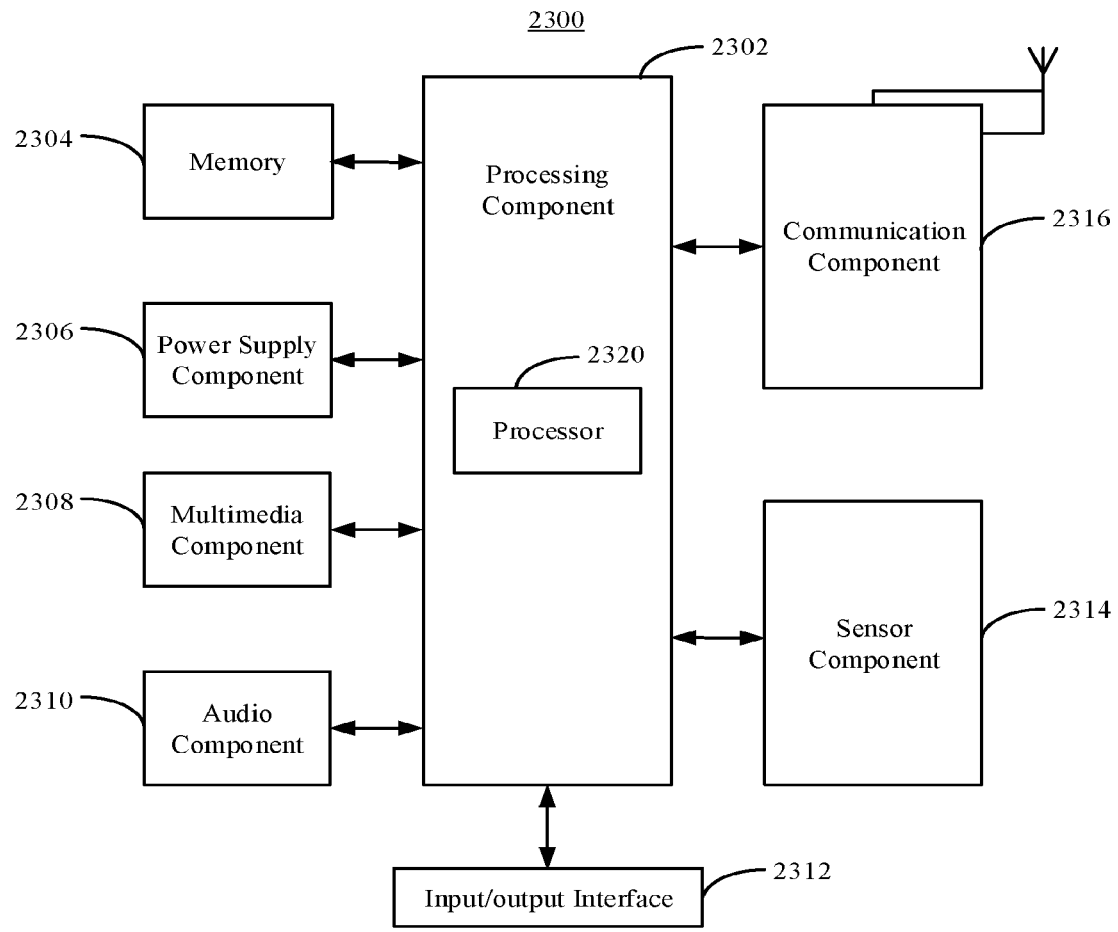
FIG. 23 is a schematic block diagram illustrating an apparatus for indicating link adaptation parameters according to an embodiment of the present disclosure.

FIG. 23 is a schematic block diagram illustrating an apparatus 2300 for indicating link adaptation parameters according to an embodiment of the present disclosure. For example, the apparatus 2300 can be a mobile telephone, a computer, a digital broadcasting terminal, a message receiving and transmitting device, a game console, a tablet device, a medical device, a fitness device, a personal digital assistant, and the like.

Referring to FIG. 23, the apparatus 2300 may include one or more of the following components: a processing component 2302, a memory 2304, a power supply component 2306, a multimedia component 2308, an audio component 2310, an input/output (I/O) interface 2312, a sensor component 2314 and a communication component 2316.

The processing component 2302 generally controls overall operations of the apparatus 2300, such as operations associated with display, phone calls, data communications, camera operations, and recording operations. The processing component 2302 may include one or more processors 2320 to execute instructions to complete all or part of the steps of the above methods. In addition, the processing component 2302 may include one or more modules which facilitate the interaction between the processing component 2302 and other components. For example, the processing component 2302 may include a multimedia module to facilitate the interaction between the multimedia component 2308 and the processing component 2302.

The memory 2304 is to store various types of data to support the operation of the apparatus 2300. Examples of such data include instructions for any application or method operated on the apparatus 2300, contact data, phonebook data, messages, pictures, videos, and so on. The memory 2304 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 2306 provides power to different components of the apparatus 2300. The power supply component 2306 may include a power management system, one or more power supplies, and other components associated with generating, managing, and distributing power for the apparatus 2300.

The multimedia component 2308 includes a screen providing an output interface between the apparatus 2300 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense duration and a pressure associated with the touch or swipe. In some embodiments, the multimedia component 2308 may include a front camera and/or a rear camera. The front camera and/or rear camera may receive external multimedia data when the apparatus 2300 is in an operating mode, such as a photographing mode or a video mode. Each of the front camera and the rear camera may be a fixed optical lens system or have focal length and optical zooming capability.

The audio component 2310 is configured to output and/or input an audio signal. For example, the audio component 2310 includes a microphone (MIC). When the apparatus 2300 is in an operating mode, such as a call mode, a recording mode, and a voice recognition mode, the MIC is to receive an external audio signal. The received audio signal may be further stored in the memory 2304 or transmitted via the communication component 2316. In some embodiments, the audio component 2310 further includes a speaker to output an audio signal.

The I/O interface 2312 may provide an interface between the processing component 2302 and peripheral interface modules. The above peripheral interface modules may include a keyboard, a click wheel, buttons and so on. These buttons may include, but are not limited to, a home button, a volume button, a starting button and a locking button.

The sensor component 2314 includes one or more sensors to provide status assessments of various aspects for the apparatus 2300. For example, the sensor component 2314 may detect the on/off status of the apparatus 2300, and relative positioning of component, for example, the component is a display and a keypad of the apparatus 2300. The sensor component 2314 may also detect a change in position of the apparatus 2300 or a component of the apparatus 2300, a presence or absence of the contact between a user and the apparatus 2300, an orientation or an acceleration/deceleration of the apparatus 2300, and a change in temperature of the apparatus 2300. The sensor component 2314 may include a proximity sensor to detect the presence of a nearby object without any physical contact. The sensor component 2314 may further include an optical sensor, such as a Complementary Metal Oxide Semiconductor (CMOS) or Charge-coupled Device (CCD) image sensor which is used in imaging applications. In some embodiments, the sensor component 2314 may further include an acceleration sensor, a gyroscope sensor, a magnetic sensor, a pressure sensor, or a temperature sensor.

The communication component 2316 is to facilitate wired or wireless communication between the apparatus 2300 and other devices. The apparatus 2300 may access a wireless network that is based on any communication standard, such as Wi-Fi, 2G or 3G, or a combination thereof. In an exemplary embodiment, the communication component 2316 receives a broadcast signal or broadcast-associated information from an external broadcast management system via a broadcast channel. In an exemplary embodiment, the communication component 2316 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In an exemplary embodiment, the apparatus 2300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method.

In an exemplary embodiment, there is also provided a non-transitory computer readable storage medium including instructions, such as the memory 2304 including instructions. The instructions may be executed by the processor 2320 of the apparatus 2300 to perform the above described methods. For example, the non-transitory computer readable storage medium may be a ROM, a Random Access Memory (RAM), a CD-ROM, a magnetic tape, a floppy disk, an optical data storage device, and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relation or order existing between these entities or operations. Also, the terms "including", "containing", or any variation thereof is intended to cover non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in the process, method, article or device including the elements.

The methods and apparatuses provided by the embodiments of the present disclosure have been described in detail above. Specific examples are used herein to explain the principles and implementations of the present disclosure. The description of the above embodiments is only used to help understand methods and core ideas in the present disclosure. At the same time, those of ordinary skill in the art can apply some changes in the specific implementation and the scope of application based on the idea of the present disclosure. In conclusion, the content of the present specification should not be construed as any limitation to the present disclosure.

The invention claimed is:

1. A method for indicating link adaptation parameters, comprising:
   determining a link adaptation parameter subset from a link adaptation parameter set, wherein the link adaptation parameter subset comprises one or more link adaptation parameters, wherein the link adaptation parameter comprises a repetition number, the link adaptation parameter set comprises a repetition number set, and the link adaptation parameter subset comprises a repetition number subset;
   determining first indication information for indicating a target repetition number according to a second association relationship between indication information with repetition number; and
   transmitting the first indication information the first indication information indicates the target repetition number in the repetition number subset.

2. The method according to claim 1, further comprising: transmitting the link adaptation parameter subset to the terminal.

3. The method according to claim 1, wherein the link adaptation parameter further comprises a modulation and coding scheme, and determining the link adaptation parameter subset from the link adaptation parameter set further comprises:
   determining a modulation and coding scheme subset from a modulation and coding scheme set, wherein the modulation and coding scheme subset comprises one or more modulation and coding schemes.

4. The method according to claim 3, wherein the method further comprises:
   determining second indication information for indicating target modulation and coding scheme according to a first association relationship between indication information with modulation and coding scheme, and transmitting the second indication information to the terminal.

5. The method according to claim 1, wherein the link adaptation parameter further comprises a modulation and coding scheme, and determining the link adaptation parameter subset from the link adaptation parameter set comprises:
   determining a modulation and coding scheme subset from a modulation and coding scheme set, wherein the modulation and coding scheme subset comprises one or more modulation and coding schemes; and
   determining a repetition number subset from a repetition number set, wherein the repetition number subset comprises one or more repetition numbers.

6. The method according to claim 5, wherein the first indication information comprises a first part for indicating a modulation and coding scheme and a second part for indicating a repetition number out of a candidate repetition number subset, wherein the candidate repetition number subset is determined according to a third association relationship between repetition number with modulation and coding scheme.

7. The method according to claim 1, further comprising:
   recording historical channel state information of the terminal;
   wherein determining the link adaptation parameter subset from the link adaptation parameter set comprises:
   determining, from the link adaptation parameter set, one or more link adaptation parameters matched with the historical channel state information as the link adaptation parameter subset.

8. The method according to claim 1, further comprising:
   determining current channel state information of the terminal;
   wherein the target link adaptation parameter is a link adaptation parameter in the link adaptation parameter subset which matches with the current channel state information.

9. The method according to claim 1, wherein determining the link adaptation parameter subset from the link adaptation parameter set comprises:
   determining the link adaptation parameter subset from the link adaptation parameter set in response to determining that the terminal belongs to a preset type, or in response to determining that a location of the terminal is changing with a first frequency less than a first preset frequency, or in response to determining that historical channel state information of the terminal is changing with a second frequency less than a second preset frequency;
   wherein the link adaptation parameter subset comprises a plurality of continuous link adaptation parameters in the link adaptation parameter set, or a plurality of discontinuous link adaptation parameters in the link adaptation parameter set.

10. A non-transitory computer readable storage medium storing a computer program, wherein the computer program, when executed by a processor, causing the processor to implement the steps of the method for indicating link adaptation parameters according to claim 1.

11. A method for determining link adaptation parameters, comprising:
    receiving first indication information for indicating a link adaptation parameter transmitted by a base station, wherein the link adaptation parameter comprises a repetition number; and
    determining, according to a prestored second association relationship between indication information with repetition number in repetition number subset out of repetition number set, a target link adaptation parameter in a link adaptation parameter subset which corresponds to the received first indication information, wherein the repetition number subset comprises at least one repetition number.

12. The method according to claim 11, wherein the link adaptation parameter comprises a modulation and coding scheme, and the method further comprises:
    determining, according to a prestored first association relationship between indication information with modulation and coding scheme in modulation and coding scheme subset out of modulation and coding scheme set, a target modulation and coding scheme in a modulation and coding scheme subset which corresponds to the received second indication information.

13. The method according to claim 11, wherein the link adaptation parameter further comprises a modulation and coding scheme,
    the first indication information comprises a first part of the indication information for indicating modulation and coding scheme and a second part of the indication information for indicating repetition number;
    wherein determining the target link adaptation parameter in the link adaptation parameter subset which corresponds to the received first indication information comprises:
    determining, according to a prestored association relationship between indication information with modulation and coding scheme, a target modulation and coding scheme corresponding to the first part of the indication information;
    determining, according to a third association relationship between modulation and coding scheme with repetition number, a candidate repetition number subset corresponding to the target modulation and coding scheme; and
    determining, according to a prestored association relationship between indication information with candidate repetition number subset, a target repetition number in the candidate repetition number subset which corresponds to the second part of the indication information.

14. An electronic device, comprising:
    a processor; and
    a memory for storing instructions executable by the processor,
    wherein the processor is configured to implement the method for determining link adaptation parameters according to claim 11.

15. A non-transitory computer readable storage medium storing a computer program, wherein the computer program, when executed by a processor, causing the processor to implement the steps of the method for determining link adaptation parameters according to claim 11.

16. The method according to claim 11, further comprising:
receiving the link adaptation parameter subset sent by the base station.

17. An electronic device, comprising:
a processor; and
a memory for storing instructions executable by the processor,
wherein the processor is configured to:
determine a link adaptation parameter subset from a link adaptation parameter set, wherein the link adaptation parameter subset comprises one or more link adaptation parameters, wherein the link adaptation parameter comprises a repetition number, the link adaptation parameter set comprises a repetition number set, and the link adaptation parameter subset comprises a repetition number subset;
determine first indication information for indicating a target repetition number according to a second association relationship between indication information with repetition number; and
transmit the first indication information to a terminal, wherein the first indication information indicates the target repetition number in the repetition number subset.

18. The electronic device according to claim 17, wherein the processor is further configured to:
transmit the link adaptation parameter subset to the terminal.

19. The electronic device according to claim 17, wherein the link adaptation parameter further comprises a modulation and coding scheme, and the processor is further configured to:
determine a modulation and coding scheme subset from a modulation and coding scheme set, wherein the modulation and coding scheme subset comprises one or more modulation and coding schemes.

20. The electronic device according to claim 19, wherein the processor is further configured to:
determine second indication information for indicating a target modulation and coding scheme according to a first association relationship between indication information with modulation and coding scheme, and transmit the second indication information to the terminal.

\* \* \* \* \*